United States Patent
Shallcross et al.

(10) Patent No.: US 8,322,782 B2
(45) Date of Patent: Dec. 4, 2012

(54) SECURING WIRE HARNESS TO A ROOF LINER

(75) Inventors: Mark Shallcross, Dublin, OH (US); Todd Hemmert, Dublin, OH (US); Saeed Namakydoost, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 285 days.

(21) Appl. No.: 11/966,234

(22) Filed: Dec. 28, 2007

(65) Prior Publication Data
US 2009/0115226 A1  May 7, 2009

Related U.S. Application Data

(60) Provisional application No. 60/877,851, filed on Dec. 29, 2006.

(51) Int. Cl.
- *B62D 25/06* (2006.01)
- *B23P 11/00* (2006.01)
- *F16L 3/08* (2006.01)
- *F16B 45/00* (2006.01)

(52) U.S. Cl. ....... 296/210; 296/208; 296/214; 248/74.3; 248/74.4; 248/74.1; 24/297; 24/453

(58) Field of Classification Search .................. 248/74.3, 248/74.4, 74.1, 174, 155, 66, 68.1, 136; 296/208, 296/210, 214; 24/297, 453, 16 PB
See application file for complete search history.

(56) References Cited

U.S. PATENT DOCUMENTS

| | | | | |
|---|---|---|---|---|
| 4,505,611 A * | 3/1985 | Nagashima et al. | ............ | 403/21 |
| 5,131,613 A * | 7/1992 | Kamiya et al. | ............... | 248/74.3 |
| 5,507,610 A * | 4/1996 | Benedetti et al. | ............. | 411/339 |
| 5,887,939 A | 3/1999 | Yamaguchi et al. | | |
| 6,038,764 A * | 3/2000 | Yamaguchi et al. | ............ | 29/854 |
| 6,120,091 A * | 9/2000 | Reich et al. | .................... | 296/214 |
| 6,394,538 B1 * | 5/2002 | Murdock | ...................... | 296/214 |
| 6,513,867 B1 * | 2/2003 | Bess et al. | ................. | 296/216.08 |
| 6,515,229 B2 * | 2/2003 | Aoki et al. | ................... | 174/72 A |
| 6,570,093 B2 * | 5/2003 | Doshita et al. | ............. | 174/72 A |
| 6,764,050 B2 * | 7/2004 | Takenaga | ........................ | 248/71 |
| 7,093,884 B2 | 8/2006 | Eichhorst et al. | | |
| 2002/0030387 A1* | 3/2002 | Breymaier | ...................... | 296/214 |
| 2004/0145211 A1 | 7/2004 | Eichhorst et al. | | |
| 2004/0169390 A1* | 9/2004 | Tiesler et al. | ................ | 296/37.8 |

FOREIGN PATENT DOCUMENTS

| | | |
|---|---|---|
| EP | 1389551 | 8/2003 |
| JP | 03061139 | 3/1991 |
| JP | 03062471 | 3/1991 |
| JP | 10167116 | 6/1998 |
| JP | 10208556 | 8/1998 |
| JP | 2002157921 | 5/2002 |

* cited by examiner

*Primary Examiner* — Glenn Dayoan
*Assistant Examiner* — Sunsurraye Westbrook
(74) *Attorney, Agent, or Firm* — Mark Duell; Emerson Thomson Bennett

(57) ABSTRACT

Generally provided is a roof-liner assembly for attaching a wire harness to a roof liner, the assembly having a wire harness that is attached to a roof liner by a harness clip and a harness-clip base, wherein the harness clip has a substantially closed-loop element that substantially surrounds the exterior surface of a wire-harness longitudinal section, and wherein the harness-clip base is secured to the roof liner.

5 Claims, 14 Drawing Sheets

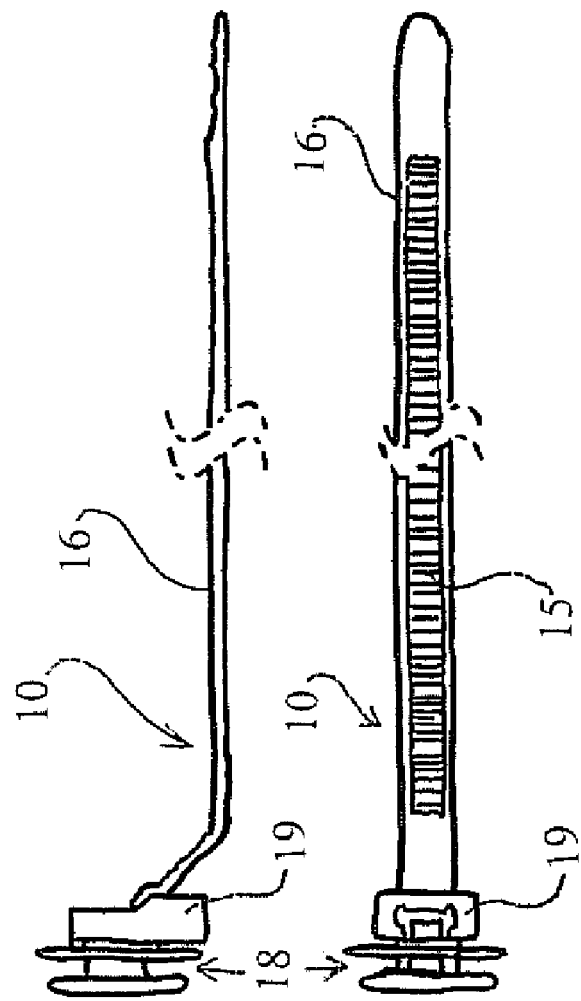
FIG. - 2A
FIG. - 2B
FIG. - 3A
FIG. - 3B

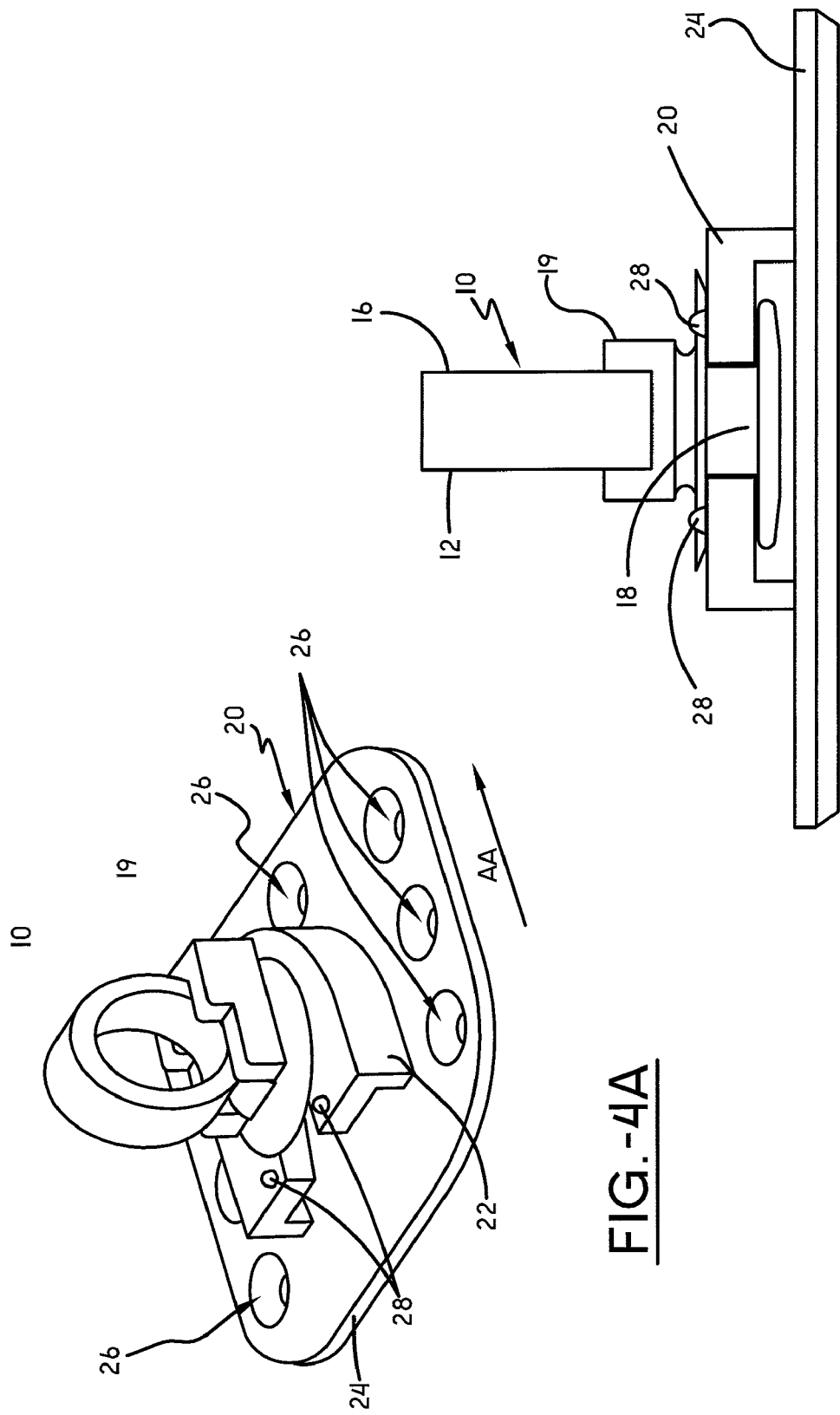

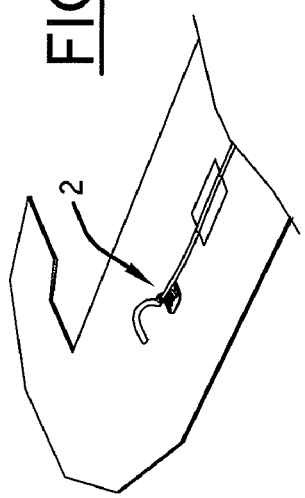
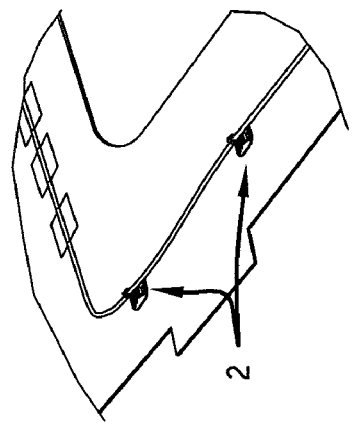
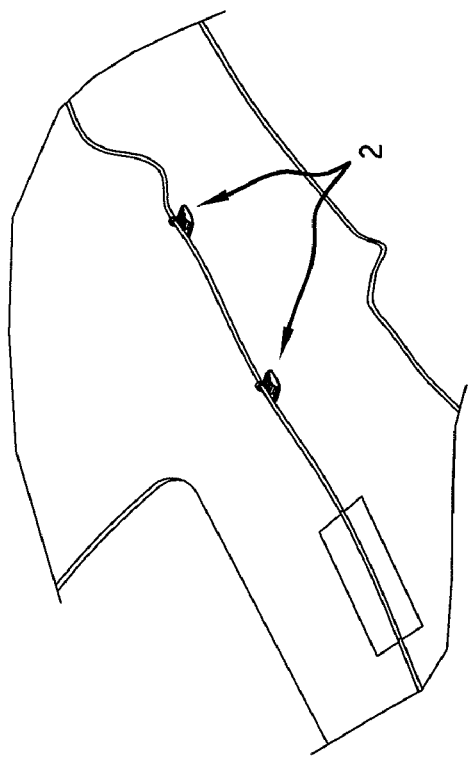
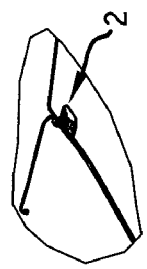

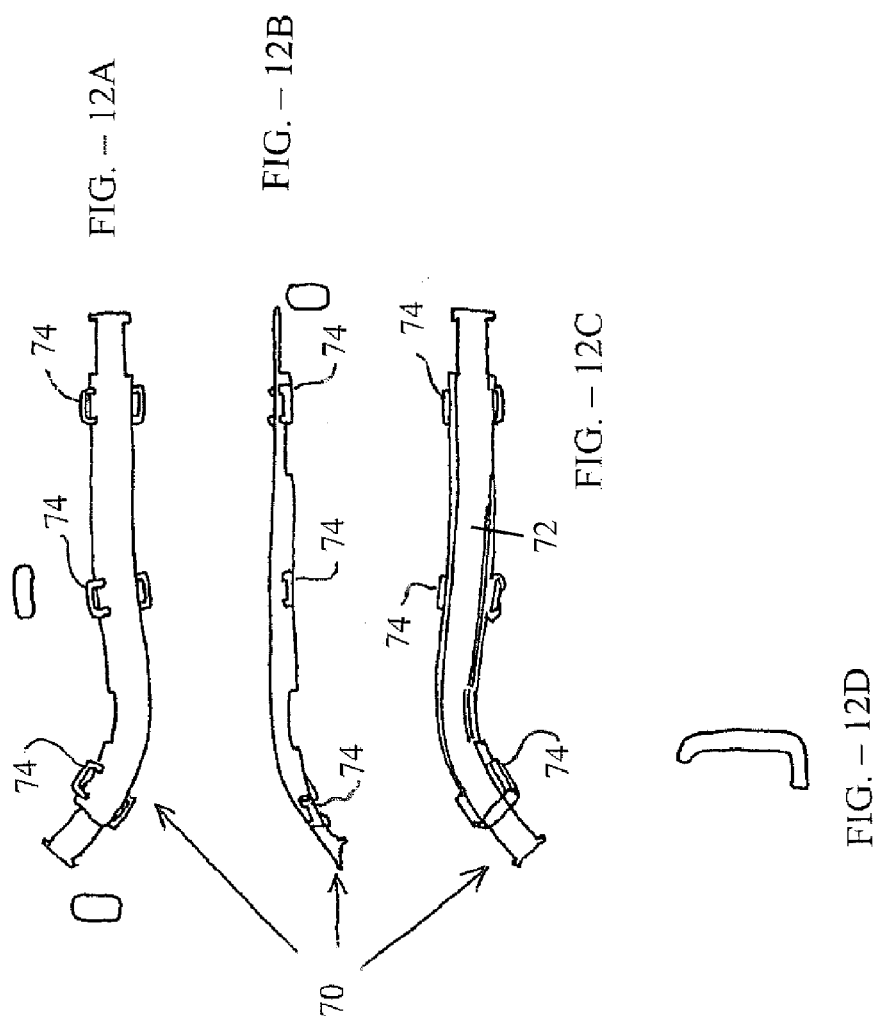

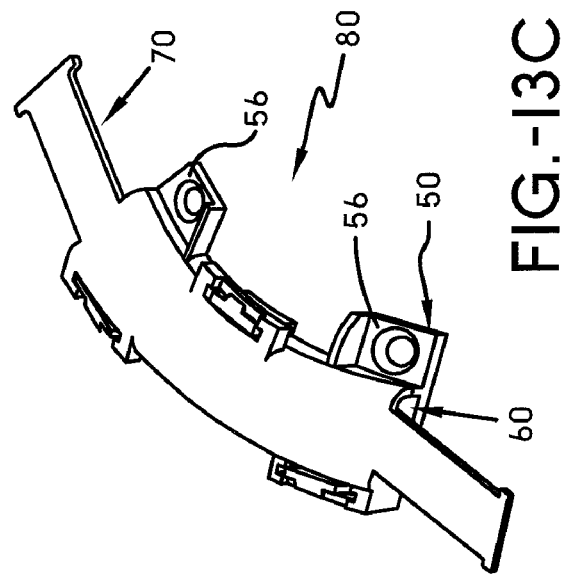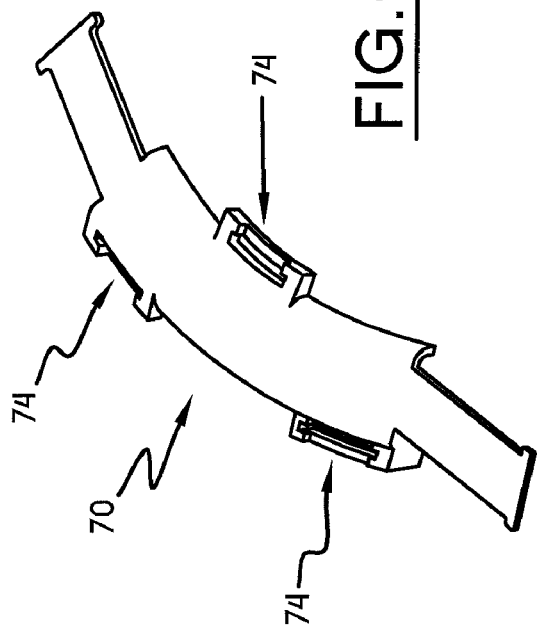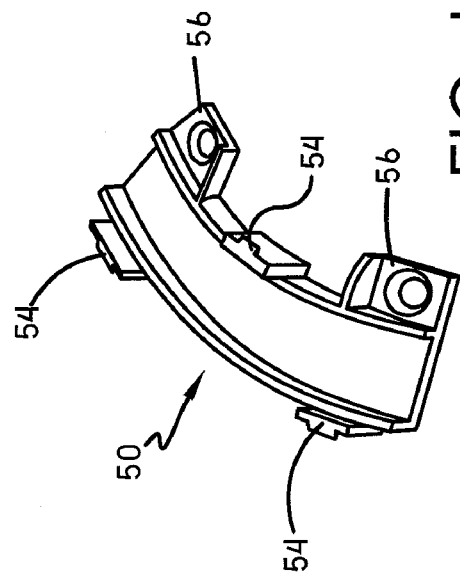

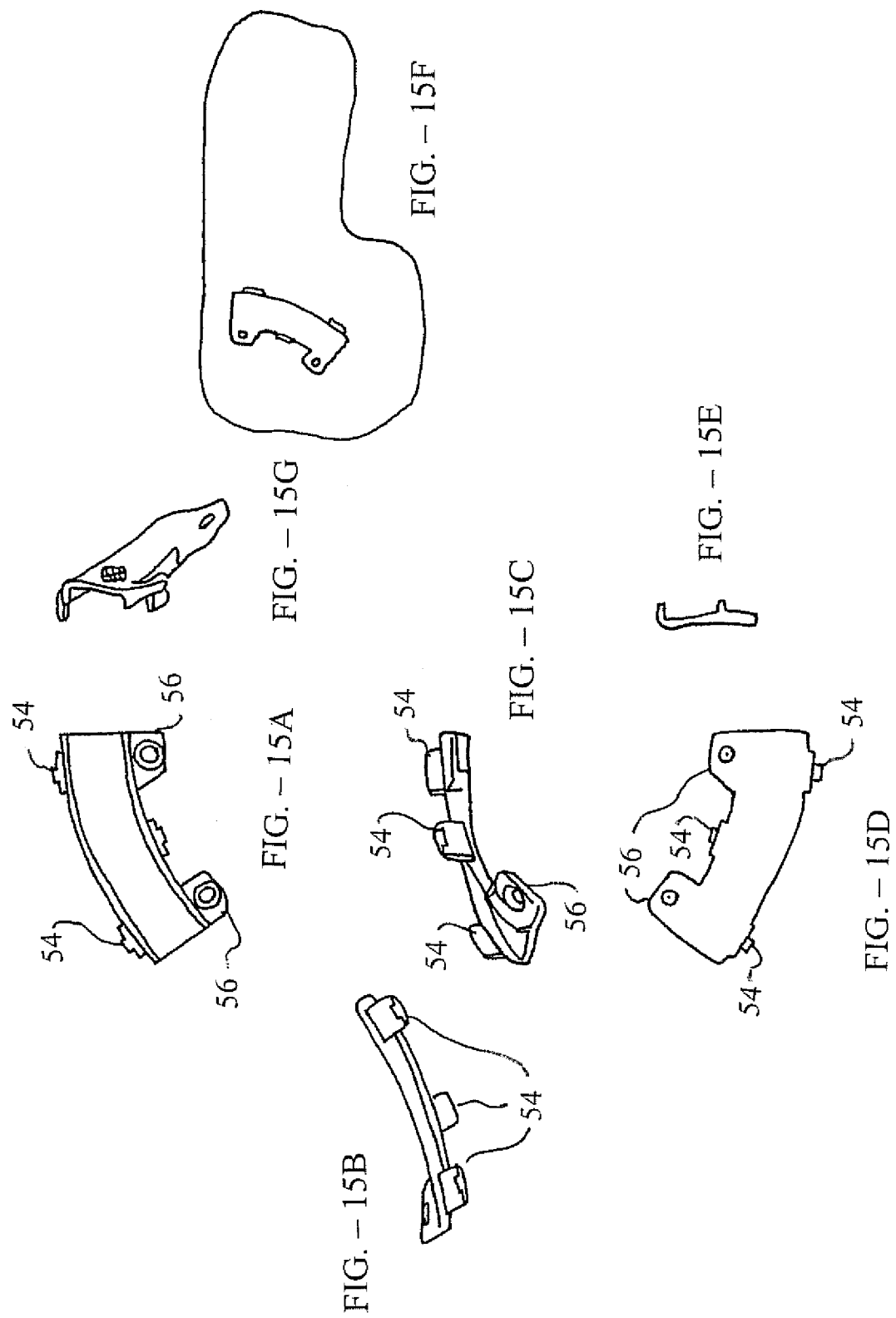

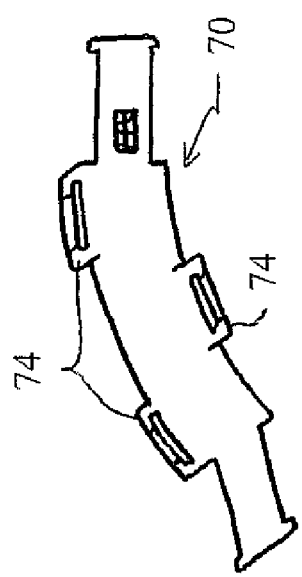
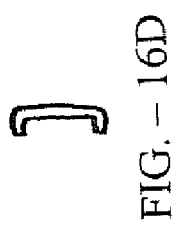
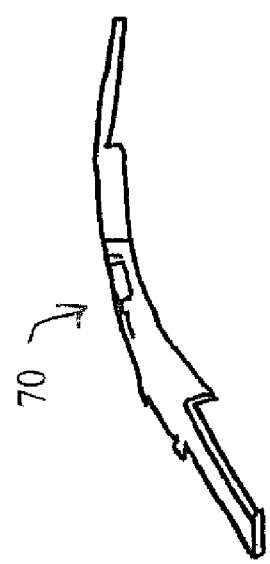
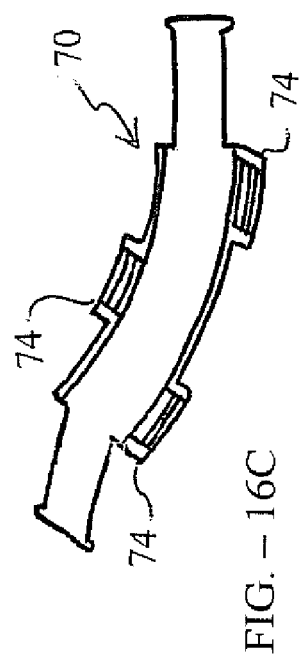
FIG. – 16A
FIG. – 16B
FIG. – 16C
FIG. – 16D

SECURING WIRE HARNESS TO A ROOF LINER

CROSS-REFERENCE TO RELATED APPLICATIONS

This application claims priority to U.S. Ser. No. 60/877,851 entitled Securing Wire Harness to a Roof Liner, filed Dec. 29, 2006. All of the subject matter disclosed by U.S. Ser. No. 60/877,851 is hereby incorporated by reference into this application.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Description of Related Art

The utility of wire harnesses in automotive construction is well-known, and attaching a wire harness to a roof liner during automotive construction is also well known. Additional compositions and methods that can be used to attach a wire harness to a roof liner are needed.

BRIEF SUMMARY OF THE INVENTION

A method for attaching a wire harness to a roof liner by using a harness clip and a harness-clip base, the method having the steps of attaching the harness-clip base to the roof liner; attaching the harness clip to the harness-clip base; and inserting a wire-harness longitudinal section into a substantially closed-loop element of the harness clip, wherein the closed loop element substantially surrounds the exterior surface of the wire-harness longitudinal section.

A roof-liner assembly for attaching a wire harness to a roof liner, the assembly having a wire harness that is attached to a roof liner by a harness clip and a harness-clip base, wherein the harness clip has a substantially closed-loop element that substantially surrounds the exterior surface of a wire-harness longitudinal section, and wherein the harness-clip base is secured to the roof liner.

A roof-liner assembly having a protector base having a structural element that describes a first part of a substantially closed-loop wire-harness channel and a protector lid having a structural element that describes a second part of the substantially closed-loop wire-harness channel; wherein the protector base and the protector lid form at least a portion of the substantially closed-loop wire-harness channel by attaching to each other; wherein the wire-harness channel substantially surrounds a wire-harness longitudinal section; and wherein the protector base is attached to a roof liner.

A method for attaching a wire harness to a roof liner, the method having the steps of attaching a protector base having a structural element that describes a first part of a substantially closed-loop wire-harness channel to a protector lid that has a structural element that describes a second part of the substantially closed-loop wire-harness channel; surrounding a wire-harness longitudinal section with the channel; and attaching the protector base to a roof liner.

Attaching a wire harness to a roof liner using the subject roof-liner assembly embodiments can reduce factory assembly time and allow for easy servicing of the wire harness. For service, it will also allow for either the harness or the roof liner to be replaced without adding the expense of two parts when only one part needs to be replaced. Also, if the wire harness needs to be replaced during service, the subject roof-liner assembly allows for little or no damage to the roof liner, thus reducing costs. Furthermore, by using the subject roof-liner assembly embodiments, the relative location of wire harness is predictable and fixed in position relative to other vehicle construction elements.

BRIEF DESCRIPTION OF THE DRAWINGS

FIG. 2A is a front view of a harness clip.

FIG. 2B is a side view of a harness clip.

FIG. 3A is a top view of a harness-clip base.

FIG. 3B is a side view of a harness-clip base.

FIG. 4A is a perspective view of a harness clip that is removably attached to a harness-clip base.

FIG. 4B is a side view of a harness clip that is removably attached to a harness-clip base.

FIG. 6A is a perspective view of a portion of a roof-liner assembly.

FIG. 6B is a perspective view of a portion of a roof-liner assembly.

FIG. 6C is a perspective view of a portion of a roof-liner assembly.

FIG. 6D is a perspective view of a portion of a roof-liner assembly.

FIG. 12A is a top perspective view of a protector lid.

FIG. 12B is a side view of a protector lid.

FIG. 12C is a bottom view of a protector lid.

FIG. 12D is a cross-sectional side view of a protector lid.

FIG. 13A is a top view of a protector lid.

FIG. 13B is a top view of a protector base.

FIG. 13C is a perspective view of a protector-base and protector-lid assembly.

FIG. 15A is a top view of a protector base.
FIG. 15B is a side perspective view of a protector base.
FIG. 15C is a side perspective view of a protector base.
FIG. 15D is a bottom view of a protector base.
FIG. 15E is a cross-sectional side view of a protector base.
FIG. 15F is a view of a protector base attachably mounted on a roof liner.
FIG. 15G is a perspective view of a protector base.
FIG. 16A is a top view of a protector lid.
FIG. 16B is a perspective side view of a protector lid.
FIG. 16C is a bottom view of a protector lid.
FIG. 16D is a cross sectional side view of a protector lid.

DETAILED DESCRIPTION OF ILLUSTRATIVE EMBODIMENTS

Figure 1A:
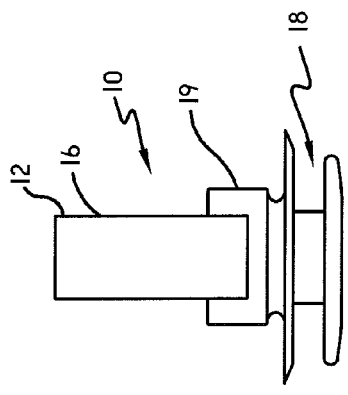
FIG. 1A is a front view of a harness clip.
Figure 1B:
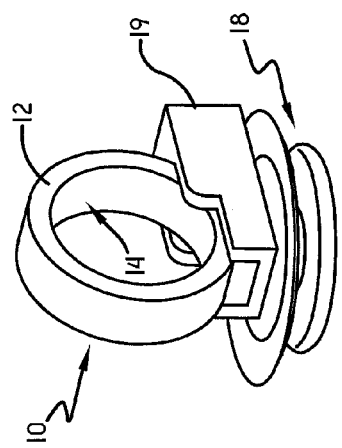
FIG. 1B is an exploded front view of a harness clip wherein the substantially closed-loop element substantially surrounds the exterior surface of a wire-harness longitudinal section.
Figure 1C:
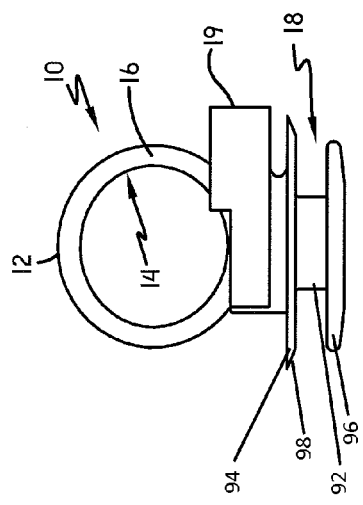
FIG. 1C is a side view of a harness clip.
Figure 1D:
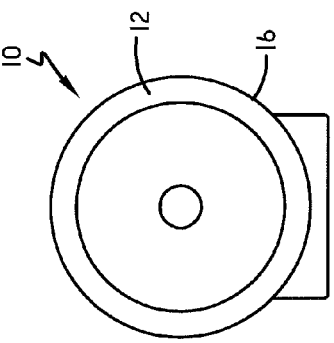
FIG. 1D is a perspective view of a harness clip.

With reference to the Figures, which illustrate selected portions or elements of roof-liner-assembly embodiments and related methods, at least first and second embodiments of roof-liner assembly 2 are provided. The first embodiment of roof-liner assembly 2, as generally shown in FIGS. 1A-6D, is directed to roof-liner assembly 2 having harness clip 10 and harness-clip base 20 that are used in combination to attach wire harness 30 to roof liner 40. The second embodiment of roof-liner assembly 2, as generally shown in FIGS. 7-17, is directed to a roof-liner assembly having protector base 50 and protector lid 70 that are used in combination to attach wire harness 30 to roof liner 40. As used herein, roof-liner assembly 2 can be understood as roof liner 40 having wire harness 30 attached thereto by: harness clip 10 and harness-clip base 20 being used in combination; protector base 50 and protector lid 70 being used in combination, or both.

As mentioned above, in the first embodiment, roof-liner assembly 2 uses harness clip 10 and harness-clip base 20 to attach wire harness 30 to roof liner 40. Although there is no limitation directed to useful applications, at least one embodiment provides for using roof-liner assembly 2 in automotive applications.

As shown in the figures, embodiments provide for harness clip 10 having one or more of the following elements: substantially closed-loop element 12, harness clip closed-loop forming element 16, slotted male-attachment element 18, and substantially closed-loop locking element 19. An embodiment provides for harness clip 10 having all of these elements.

An embodiment provides for harness clip 10 having substantially closed-loop element 12 that can at least partially or substantially surround or support an exterior surface of wire harness 30. Embodiments provide for closed-loop element 12 having an inner-loop surface and an exterior-loop surface. An embodiment provides for closedloop element 12 having substantially circular inner-loop surface 14 that at least partially or substantially surrounds or supports an exterior surface of wire harness 30. As shown in FIG. 1A, the male attachment element 18 has a first portion 92 with a first diameter and a second portion 94 with a second diameter larger than the first diameter. The first portion 92 is received in a slot 82 of the base 20. The element 18 also has a third portion 96 having a third diameter.

As displayed in FIGS. 3A and 3B an embodiment provides for inner-loop surface 14 having a ribbed surface 15 that assists in securing harness clip closed-loop forming element 16 into substantially closed-loop locking element 19.

As the embodiments are displayed in FIGS. 3A and 3B, closed-loop forming element 16 can be manufactured using any bendable or malleable material that will allow closed-loop forming element 16 to be bent and thereby inserted into substantially closed-loop locking element 19. As a nonlimiting example, polymeric bendable materials can be selected by persons of ordinary skill in the art without having to exercise undue experimentation. Useful polymeric materials are well known and commercially available.

In addition to selecting useful materials to be used in manufacturing closed-loop forming element 16, persons of ordinary skill in the art can also determine useful longitudinal lengths that allow closed-loop forming element 16 to completely surround at least a portion of wire harness 30. An embodiment provides for the surrounded portion of wire harness 30 to be the exterior surface of wire harness 30. An alternate embodiment provides for the surrounded portion of wire harness 30 to be exterior surface of a wire harness longitudinal section 34.

Harness clip 10 further has substantially closed-loop locking element 19 that secures substantially closed-loop element 12 in position. As mentioned above, embodiments provide for ribbed surface 15 helping to secure closed-loop forming element 16 in a substantially fixed position. Substantially closed-loop locking element 19 can have an open passageway running therethrough, wherein the dimensions of the open passageway allow for harness clip closed-loop forming element 16 to pass into and at least partially therethrough. Upon entering the open passageway of substantially closed-loop locking element 19, harness clip closed-loop forming element 16 begins to form or forms substantially closed-loop element 12.

Embodiments provide for the open passageway of substantially closed-loop locking element 19 to have a protrusion or prong that can lock into a section of ribbed surface 15 and thereby aid in securing harness clip closed-loop forming element 16 in a substantially fixed position.

As shown in FIGS. 1A-6D. Harness clip 10 can also have slotted male-attachment element 18 that can be inserted into slotted female-attachment element 22 of harness-clip base 20. Embodiments provide for slotted male-attachment element 18 having a channel that allows it to removably slide in and out of female-attachment element 22. Interlocking elements such as slotted mail-attachment element 18 and slotted female-attachment element 22 are well known and useful sizes and dimensions can be selected by persons of ordinary skill in the art without having to exercise undue experimentation.

An embodiment provides for harness clip 10 to be assembled to wire harness 30 before harness clip 10 is inserted into harness-clip base 20.

Embodiments provide for harness-clip base 20 having at least one or a combination of the following elements: roof-liner mounting element 24, slotted female-attachment element 22, mounting-element orifice 26, and locking node 28. An embodiment provides for harness-clip base 20 having all of these elements, Roof-liner mounting element 24 can be substantially planar or have any surface shape that will allow it to be mounted to roof liner 40. Roof-liner mounting element 24 can also have one or more mounting-element orifices 26. Mounting-element orifices 26 can be used in combination with glue, nails, screws, staples, or any other known means for fixing one mechanical element to another. Mounting-element orifices 26 can be used to help secure harness-clip base 20 to roof liner 40. Embodiments provide for a harness-clip base 20 to be permanently affixed to the back of the roof liner with glue (hot melt).

Figure 5C:
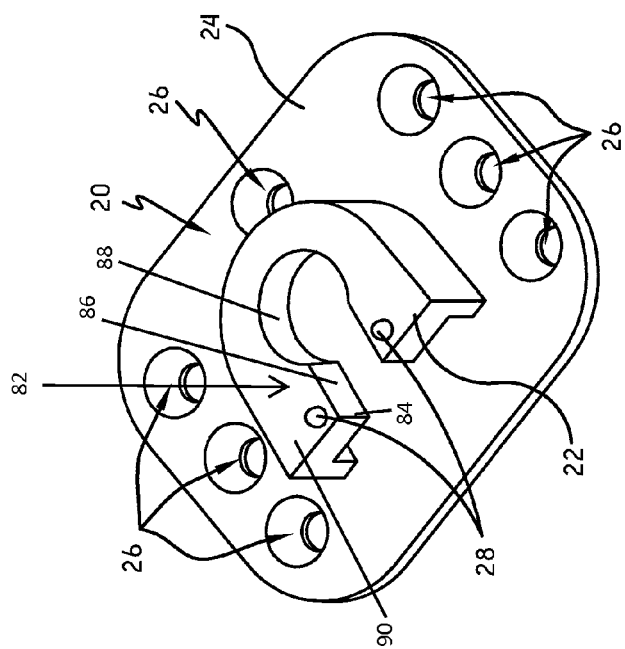
FIG. 5C is a perspective view of a harness-clip base.

As mentioned above, slotted female-attachment element 22 makes up a part of harness-clip base 20 and is used to receive slotted male-attachment element 18. Sizes and dimensions of slotted female-attachment element 22 can be selected by persons of ordinary skill in the art based upon corresponding sizes and dimensions of slotted male-attachment element 18. As illustrated in FIGS. 3A, 3B, and 5C; an embodiment provides for slotted female-attachment element 22 having a substantially horseshoe-like shape that allows corresponding slotted mail-attachment element 18 to be received therein.

Figure 5A:
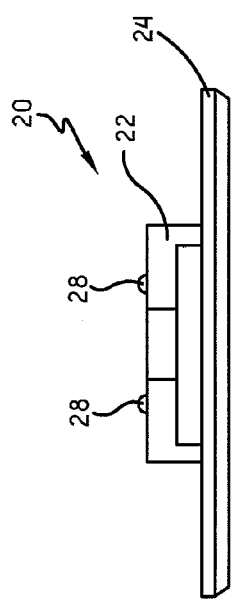
FIG. 5A is a side view of a harness-clip base.
Figure 5B:
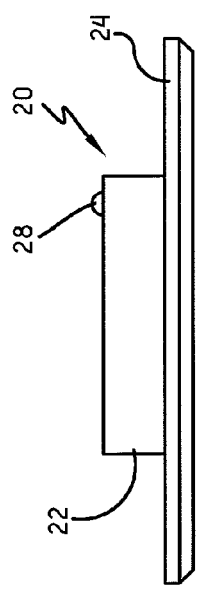
FIG. 5B is a side view of a harness-clip base.

As seen in FIG. 5C, the exemplary base 20 has the slot 82 with an entrance 84 and a first portion 86 adjacent to the entrance 84 and having a first width. The slot 82 also includes and a second portion 88 spaced from the entrance 84 by the first portion 86 and having a second width larger than the first width. Slotted female-attachment element 22 can have one or more locking nodes 28. As can be seen in FIGS. 4A and 4B, locking nodes 28 are nodes that are raised off of the surface 90 of slotted female-attachment element 22. The view of FIG. 5A is looking into the slot 82, and is in the direction of extension of the slot 82 from entrance 84 to the second portion 88. FIG. 5C shows that the nodes 28 extend perpendicular to a direction of extension the slot 82. As shown in FIG. 4B, the third portion 96 of the element 18 has a diameter larger than the second width of the slot 82. Locking nodes 28 allow harness clip 10 to be locked into a substantially fixed position with harness-clip base 20; the second portion 94 of the element 18 has diameter wider than the distance between the nodes 28. An embodiment provides for harness-clip base 22 having two locking nodes 28.

FIG. 4A illustrates that slotted male-attachment element 18 of harness clip 10 can be inserted into slotted female-attachment element 22 in direction AA. It has been noted above in the summary section that the harness clip 10 can be removed with damage to the base 20. During service only the clip 10 needs to be replaced. When the harness clip 10 is detached from the base 20, a ramped surface 98 defined by the second portion 94 of the male attachment element 18 is operable to ride up the nodes 28 so as to prevent damage to the base 20.

Wire harness 30 can be any known wire harness, and wire harnesses are well known in the art and can be selected for use with roof-liner assembly 2. In an embodiment, wire harness 30 is a conventional wire harness used in automotive construction or repair. In another embodiment, wire harness 30 has one or more wire harness longitudinal sections 34 that can be substantially surrounded and supported by substantially closed-loop element 12. The overall shape of exterior surface of a wire harness longitudinal section 34 is not intended as a limitation, and any known useful dimensions and shapes of wire harnesses can be useful. In an embodiment, wire harness 30 has substantially circular wire-harness exterior surface 36. Wire harness 30 can have a uniform shape and dimensions throughout the longitudinal length of wire harness 30. Or, in another embodiment, the shape and dimensions of the longitudinal length of wire harness 30 can be non-uniform.

Roof liner 40 can be any roof liner currently known, and useful roof liners can be selected by persons of ordinary skill in the art without having to exercise undue experimentation. There is no limitation directed to the kind of roof liner that can be employed in a roof-liner assembly 2. In an embodiment, roof liner 40 is a conventional automotive roof liner.

As shown in FIGS. 7-17, a second embodiment of roof-liner assembly 2 has protector base 50, protector lid 70, wire harness 30 and roof liner 40. In this embodiment, protector base 50 and protector lid 70 makeup two halves of substantially closed-loop wire-harness channel 60 in which at least a longitudinal section of wire harness 30 is positioned and held. There is no intended limitation directed to useful applications that this second embodiment of roof-liner assembly 2 can be used with or for. A non-limiting example of a useful application is to use this second embodiment of roof-liner assembly 2 in automotive construction or repair.

Figure 8:
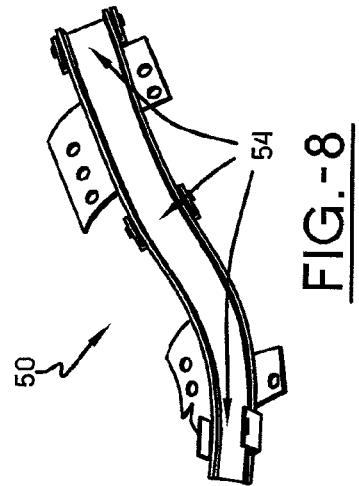
FIG. 8 is a top perspective view of a protector base.

An embodiment provides for protector base 50 having one or more of the following elements: structural element 52 that describes a first part of a substantially closed-loop wire harness channel, protector-based locking tab 54, and glue tab 56. An embodiment provides for protector base 50 having all of these elements. Structural element 52 as seen in FIG. 8 can have a substantially U-shaped channel running its entire longitudinal length, and it is this substantially U-shaped channel that forms about one half of substantially closed-loop wire-harness channel 60 that is used to support wire harness 30. Channel-forming shapes other than the substantially U-shaped channel can be employed.

Figure 11D:
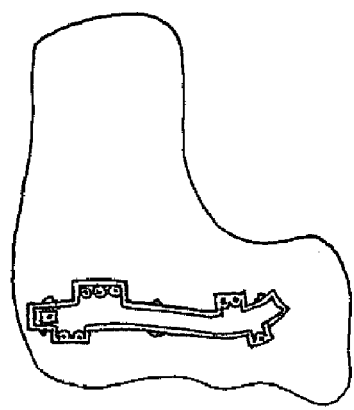
FIG. 11D is a view of a protector base mounted on a roof liner.
Figures 11A, 11B:
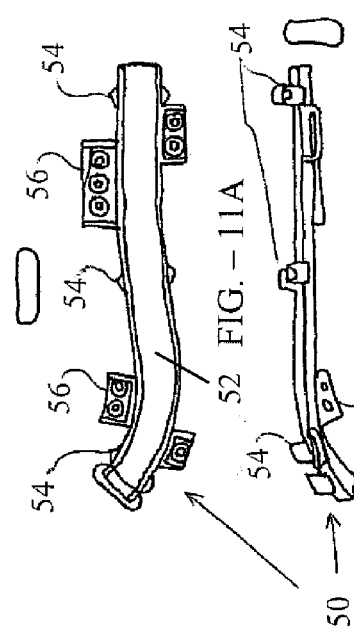
FIG. 11A is a top view of a protector base.
FIG. 11B is a side perspective view of a protector base.
Figure 11C:
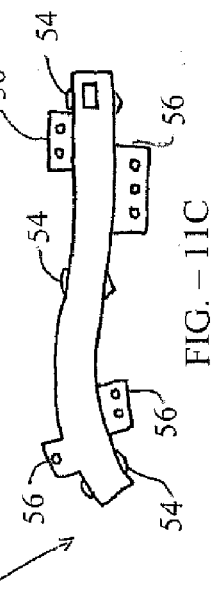
FIG. 11C is a bottom view of a protector base.
Figure 11E:
FIG. 11E is a cross-sectional side view of a protector base.
Figure 14:
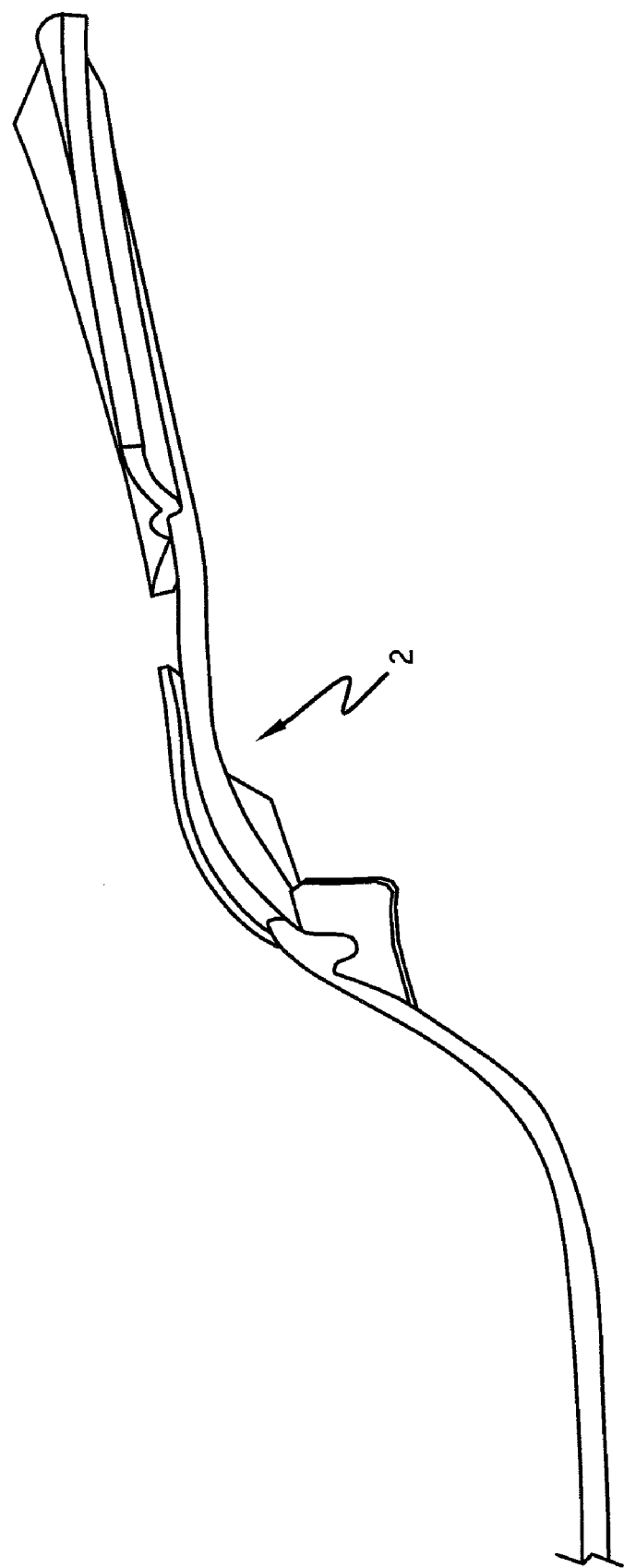
FIG. 14 is a perspective view of a protector-base and protector lid assembly used in combination with a wire harness.
Figure 17:
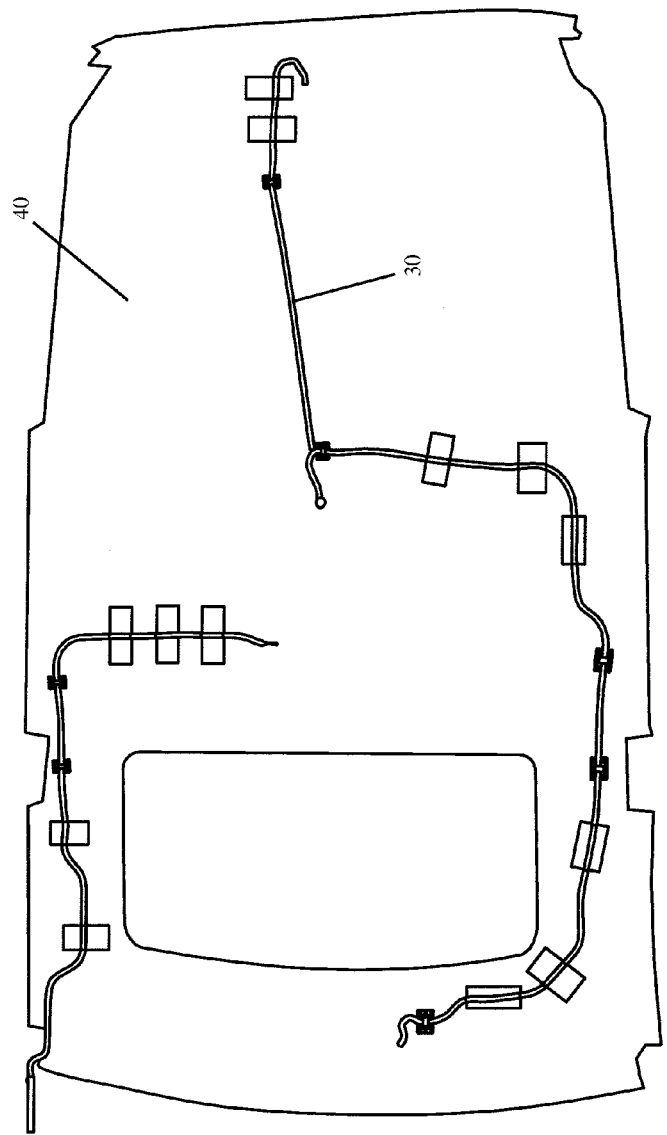
FIG. 17 is a view of a roof-liner assembly.

An embodiment provides for protector base 50 having at least one protector-base locking tab 54 that can be used to secure protector base 50 to protector lid 70. Protector base locking tab 54 can be used in combination with protector-lid locking tab 74 to attach protector base 50 to protector lid 70. As a non-limiting embodiment, protector-base locking tab 54 is a male element that can be inserted and locked into a protector-lid locking tab 74 female element. In an alternative embodiment, protector-base locking tab 54 can serve as the female element into which a corresponding male element protector-lid locking tab 74 can be inserted and locked into position. Protector base 50 can have any number of protector-base locking tabs 54. As shown in FIGS. 11A-11C, the plurality of locking tabs 54 can be arranged in pairs, one each on opposite sides of the channel 60. These figures also show the plurality of locking tabs and the plurality of connecting tabs can be disposed in alternating relation along the length of the channel 60.

The position of protector-base locking tab 54 on protector base 50 is not intended as a limitation. In one embodiment, protector-base locking tab 54 is located on the exterior surface of one of the two parallel walls making up the substantially U-shaped channel described above. The substantially U-shaped channel can be understood as having three walls; two that are substantially parallel to each other, and a third that is non-parallel relative to the other two. It is the third non-parallel wall that is directly in contact with the other two. Additional embodiments directed to the position of protector-base locking tab 54 on protector base 50 can be seen in the figures, and in at least one such embodiment, protector base 50 has six locking tabs 54.

Glue tabs 56 can also make up a portion of protector base 50, and one or more tabs 56 can be positioned substantially planar and adjacent to the single non-parallel wall of the substantially V-shaped channel. Other useful positioning of glue tabs 56 can also be employed. Glue tabs 56 provide one or more orifices through which glue droplets can be used to secure protector base 50 to roof liner 40. In an embodiment, protector base 50 is permanently fixed to roof liner 40 by glue (hot melt). In an alternative embodiment, the orifices of glue tabs 56 can be used as orifices through which screws, nails, staples, or a combination thereof can be used to secure protector base 50 to roof liner 40, thus rendering the "glue tabs" more general "connecting tabs." There is no limit directed to the number of glue tabs 56 that can make up part of protector base 50.

An embodiment provides for protector base 50 having glue tabs 56 with orifices to allow the glue (hot melt) to flow through the orifices and over glue tab 56. In addition to these orifices, a bottom surface of protector base 50 has grooves that increase the glue surface area. These features allow for increased glue (hot melt) adhesion between roof liner 40 and protector base 50.

Embodiments provide for protector lid 70 having structural element 72 that describes a second part of the substantially closed-loop wire-harness channel, and protector-lid locking tab 74. Structural element 72 as seen in FIGS. 12B and 12C can have a substantially U-shaped channel running its entire longitudinal length, and it is this substantially U-shaped channel that forms one half of substantially closed-loop wire-harness channel 60 that is used to support wire harness 30. Channel-forming shapes other than the substantially U-shaped channel can be employed. The substantially U-shaped channels of both structural element 72 and structural element 52, when combined via the connection of protector base 50 and protector lid 70, structurally define substantially closed-loop wire-harness channel 60. Stated differently, protector-base and protector-lid assembly 80 provides the perimeter structure for substantially closed-loop wire-harness channel 60.

Protector lid 70 can also have at least one protector-lid locking tab 74 that functions as described above when used in combination with protector-base locking tab 54. There is no limitation directed to the number of protector-lid locking tabs 74 that can make up a part of protector lid 70, and a non-limiting embodiment provides for six protector-lid locking tabs 74 making up a part of protector lid 70. In certain embodiments, the number of protector-lid locking tabs 74 making up a part of protector lid 70 is equal to the number of protector-base locking tabs 54 making up a part of protector base 50.

In this second embodiment of roof-liner assembly 2, wire harness 30 can be any known wire harness, and automotive wire harnesses are well-known in the art and can be selected for use. In an embodiment, wire harness 30 has one or more wire-harness longitudinal sections 34 that can be substantially surrounded and supported by substantially closed-loop wire-harness channel 60. The overall shape of exterior surface of a wire-harness longitudinal section 34 is not intended as a limitation, and any known useful dimensions and shapes of wire harnesses can be useful. In an embodiment, wire harness 30 has a substantially circular wire-harness exterior surface 36. Wire harness 30 can have a uniform shape and dimensions throughout the longitudinal length of wire harness 30, or, in another embodiment, the shape and dimensions of the longitudinal length of wire harness 30 can be non-uniform. Embodiments provide for the shape of substantially closed-loop wire-harness channel 60 to be able to surround and support wire-harness longitudinal section 34. An embodiment provides for protector lid 70 being assembled to wire harness 30. In an alternate embodiment, wire harness 30 is attached to roof liner 40 during assembly of roof liner 40; protector base 50 and protector lid 70 then latch together to secure wire harness 30 to the back of roof liner 40.

Figure 9:
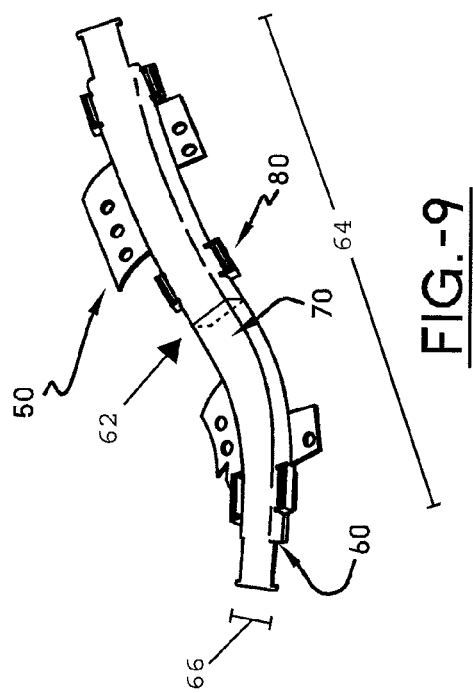
FIG. 9 is a perspective view of a protector-base and protector-lid assembly.
Figure 7:
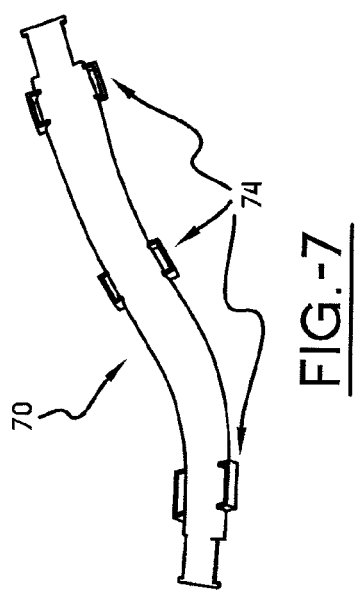
FIG. 7 is a top perspective view of a protector lid.
Figure 10:
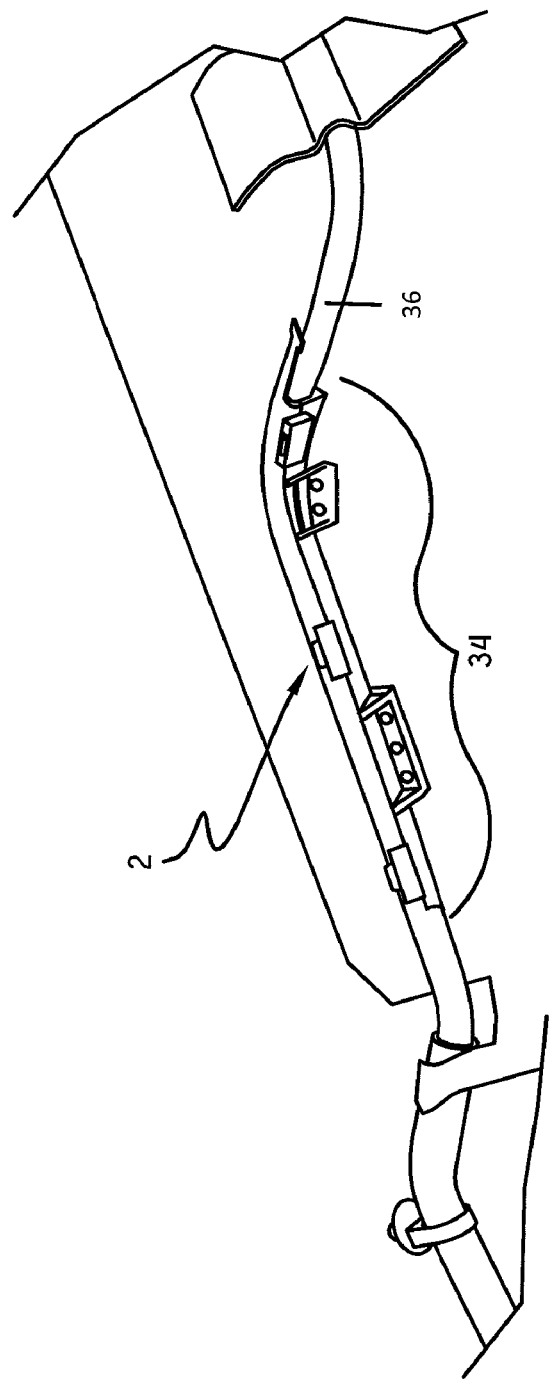
FIG. 10 is a perspective view of a portion of a roof-liner assembly.

As shown in FIGS. 9 and 10, the protector-base and protector lid assembly 80 extends along the longitudinal length of wire harness 30. As discussed above, the protector-base and protector lid assembly 80 provides the perimeter structure for the substantially closed-loop wire-harness channel 60. Each of the protector base 50 and protector lid 70 define portions of an inner surface of the channel 60. The substantially closed-loop wire harness channel 60 has a perimeter 62, which substantially surrounds and supports the wire-harness 30. The substantially closed loop wire harness channel 60 has a length 64 extending in the direction of the longitudinal length of wire harness 30. The length 64 of the substantially closed-loop wire harness channel 60 also extends along the length of wire-harness longitudinal section 34. The substantially closed-loop wire harness channel 60 has a width 66 extending in a transverse direction, as shown. As depicted in the FIGS. 9 and 10, the length 64 of the substantially closed-loop wire harness channel 60 is substantially greater than the perimeter 62 of the substantially closed-loop wire harness channel 60. In addition, the length 64 of the substantially closed-loop wire harness channel 60 is substantially greater than the width 66 of the substantially closed-loop wire harness channel 60.

Roof liner 40 can be any roof liner currently known, and useful roof liners can be selected by persons of ordinary skill in the art without having to exercise undue experimentation. There is no limitation directed to the kind of roof liner that can be employed in roof-liner assembly 2.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A roof-liner assembly comprising:
   a roof liner;
   a protector base including a plurality of connecting tabs each having at least one orifice for attaching the protective base to the roof liner and a plurality of locking tabs, wherein;
   a protector lid including a plurality of locking tabs, wherein the plurality of locking tabs of the protector base are releasibly engageable with plurality of locking tabs of the protector lid to releasibly lock the protector lid to the protector base and thereby form a substantially closed channel, each of the protector base and protector lid defining portions of an inner surface of the channel; and
   a wire-harness extending through the channel.

2. The roof-liner assembly of claim 1 wherein the plurality of locking tabs of the protector base and protector lid are arranged in pairs, one each on opposite sides of the channel.

3. The roof-liner assembly of claim 1 wherein the plurality of locking tabs and the plurality of connecting tabs disposed in alternating relation along a length of the channel 60.

4. An assembly for attaching a wire harness to a roof liner comprising:
   a base having a slot with an entrance and a first portion adjacent to the entrance and having a first width and a second portion spaced from the entrance by the first portion and having a second width larger than the first width;
   at least one pair of raised locking node extending perpendicular to a direction of extension the slot from entrance to the second portion and extending from a surface of the female attachment element and positioned near the entrance of the slot; and
   a harness clip including a closed-loop forming element and a male attachment element having a first portion received in the slot and having a first diameter and a second portion with a second diameter larger than a distance between the at least one pair of nodes and a third portion having a third diameter larger than the second width of the slot.

5. The assembly of claim 4 wherein the second portion of the male attachment element defines a ramped surface operable to ride up the at least one pair of nodes when the harness clip is detached from the base.

* * * * *